Jan. 25, 1927. 1,615,334
W. F. MacGREGOR
COMBINATION HARVESTER THRASHER
Filed Sept. 21, 1925
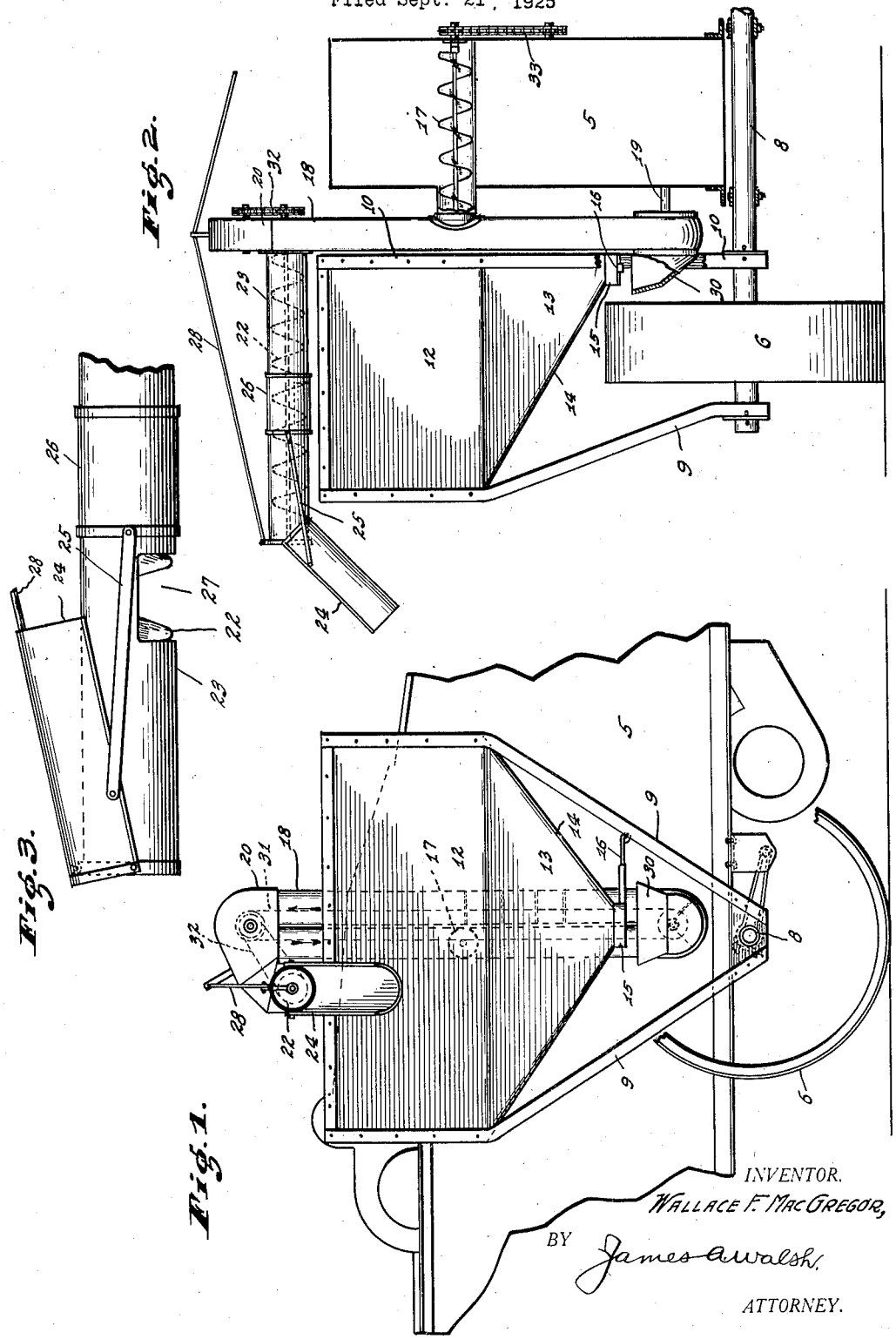
INVENTOR.
WALLACE F. MACGREGOR,
BY James A. Walsh
ATTORNEY.

Patented Jan. 25, 1927.

1,615,334

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed September 21, 1925. Serial No. 57,554.

My present invention relates to improvements in combination harvester-thrashers, and particularly to the means for conveying the grain discharging from the traveling thrasher element of the machine directly to a vehicle or to a storage bin to be delivered from the latter to a vehicle or otherwise, an example and the purposes for such a bin being disclosed in reissue Letters Patent No. 16,378, issued July 6, 1926, upon my application.

In the accompanying drawing, forming part hereof, Figure 1 is a fragmentary side elevation of the thrasher element of a combination harvester-thrasher including a bin of my present improvement; Fig. 2 a rear elevation of such thrasher element showing my improved bin attached thereto; and Fig. 3 is a detail showing the grain delivering conveyer and adjustable spout therefor which I employ.

In said drawing the portions marked 5 indicate the thrasher element of a combination harvester-thrasher, the same being mounted upon carrying wheels, as 6, supported by an axle, 8, in any ordinary or desired manner. To the axle 8, or any appropriate part of the thrasher frame I secure a suitable prop, in the present case comprising the supporting members, 9, 10, upon which I mount a bin, 12, having a hopper, 13, embodying a bottom, 14, inclined toward the thrasher and terminating in an outlet, at 15, controlled by a valve or gate, the device indicated being a sliding gate, 16, for a purpose to appear. The bin 12 may be of any desired construction and material capable of receiving and retaining a large amount of grain, and is preferably open at the top.

In a thrasher of the type illustrated the grain is separated from the straw and conveyed therefrom by an auger, 17, which leads to an elevator, 18, embodying a chain and buckets as is common and well known and driven by a shaft, 19, from any suitable source of power. Also, as is customary, at the upper end of the elevator I provide a head, 20, the discharge outlet of which is positioned to deliver the grain into an auger, 22, or other conveyer, said auger being inclosed within a tube or casing, 23, and which conveyer structure extends across bin 12 and is provided with an adjustable spout, 24, hinged to casing, 23, and connected by a link, 25, to a sleeve, 26, on casing 23 adapted to close and open a discharge outlet, 27, in said casing 23, said conveyer, as will be understood, being braced by a rod, 28, or otherwise, supported by the elevator 18 and the thrasher 5. At the lower end of said elevator 18 I provide a hopper, 30, positioned beneath valve 16, for conveying grain from the bin to said elevator. It will be understood that the elevator chain system 31, driving mechanism 32 for actuating auger 22, and sprocket arrangement 33 for actuating auger 17, may be of any conventional or appropriate character.

In the operation of a combination harvester-thrasher equipped with my improved bin 12 the grain from auger 17 is conveyed into the elevator 18 and carried upwardly thereby to the head 20, the latter being arranged, as is common, to discharge the grain, which in the present case falls into auger conveyer 22. When it is desired to deliver such grain directly into bin 12 spout 24 is adjusted in substantially parallel relation to auger 22, as indicated in Fig. 3, by throwing the same into the position shown, which movement, through link 25, forces sleeve 26 rearwardly along casing 23, so that outlet 27 is thus opened to permit grain from the auger to discharge directly into bin 12 to be there retained until it is desired to deliver the same to a vehicle. When it is desired to deliver such stored grain to a vehicle moving alongside the bin while the machine is traveling, the valve or gate 16 is opened, which permits the grain in the bin to flow into hopper 30 and thence into the elevator 18 by which it is carried upwardly and deposited from the head 20 into auger 22, the outlet for the latter, however, being closed by adjusting spout 24 in a downward direction as indicated in Fig. 2, which adjustment, through link 25, pulls sleeve 26 over said outlet. In this latter position it will be understood also that when desired the grain discharging from auger 17 may be conveyed through the head 20 and auger 22 into the spout 24 and thence to the vehicle without entering the bin 12; and it will be further understood that where the bin has been filled or partially filled with grain while the machine is moving and thrashing said valve 16 may be opened so that such grain from the bin will be conveyed upwardly by the elevator together with the grain discharging from auger 17, and in such manner the grain from both sources may be delivered into a vehicle, so that in this operation the elevator with its lower and upper inlets as described performs the double function of conveying material from two sources. However, in ordinary practice the bin 12 is of sufficient capacity to retain a vehicle load of grain, so that when loaded there is ample time for the vehicle to be driven to a place for depositing the grain and returned for another load, but where conditions are such as to make it desirable to convey the grain already stored in the bin and at the same time discharging from the thrasher this situation is taken care of by delivering the grain from both sources in the manner explained. The bin as illustrated is attached to a thrasher embodying a rocking axle 8, and therefore the prop structure 9, 10, is swivelingly mounted on said axle, but as hereinbefore explained said bin may be attached to the thrasher in any practical manner, the advantage and importance of the improvement being the cooperation of an elevator arranged to receive material from a bin and also from a thrasher to deliver such material from the bin to a vehicle and to convey material from the thrasher auger into the bin, or to convey material from the bin and the thrasher simultaneously to a suitable source of deposit.

I claim as my invention:

1. The combination, with the frame of a thrashing machine, of a bin adjacent thereto, means connected to said frame for supporting said bin, means connected to said supporting means upon which said bin is mounted, an elevator communicating with said thrashing machine and said bin for elevating grain discharging thereinto from either or both of said elements, means in said machine for conveying material into said elevator, and means communicating with said elevator for conveying material therefrom.

2. The combination, with a thrashing machine, of a bin, an elevator between said machine and bin, a hopper at the lower end of said elevator for receiving material from said bin and conveying the same into said elevator, means in said thrashing machine for delivering material into said elevator, a conveyor at the delivery end of said elevator for conveying material discharging from the elevator, and means on said machine for actuating said elevator.

3. The combination, with a thrashing machine, of a bin adjacent thereto and supported thereby, an elevator supported by said machine, a valve in said bin to permit the discharge of grain therefrom into said elevator, means in said machine for conveying grain therefrom into said elevator to be elevated independently from or together with grain discharged into said elevator from said bin, and means for conveying grain from said elevator and discharging the same into or away from said bin.

4. The combination, with a thrashing machine, of an elevator supported thereby, means in said machine and connected to said elevator for conveying grain into the latter, a bin adjacent said elevator and supported by said machine said bin having means for permitting the discharge of grain therefrom into said elevator, and a conveyor associated with said elevator for conveying grain therefrom, said conveyor having means for permitting or preventing the discharge or grain into said bin.

5. The combination, with a thrashing machine, of an elevator having a grain receiving inlet, a bin adapted to deliver grain into said inlet, a wheeled support connected to said machine and upon which said bin is mounted, means for delivering grain from said thrashing machine into said elevator, and means for conveying grain from said elevator.

6. The combination, with a thrashing machine frame, of a bin, a wheeled support upon which said bin is mounted, an elevator, means for conveying grain from said machine into said elevator, a conveyer for delivering grain from said elevator, and adjustable means on said conveyer to permit the discharge of grain therefrom into said bin.

7. The combination, with a thrashing machine frame, of a bin, an elevator, means for conveying grain from said machine into said elevator, a conveyer for discharging grain from said elevator and conveyer having an outlet communicating with said bin, a closure for said outlet, a delivering spout at the outer end of said conveyer, and means connecting said spout to said closure whereby when said spout is adjusted in one position said outlet is closed to permit grain to be conveyed into said spout and when adjusted in reverse position said outlet is opened to permit grain to discharge into said bin.

8. The combination, with a thrashing machine frame, a bin and an elevator, of a conveyer communicating with said elevator and comprising a casing having an outlet in its wall, an auger in said casing, a closure for said outlet, and means for adjusting said closure to open and close said outlet to permit grain to discharge into said bin or to be discharged from the outer end of said conveyer.

9. The combination, with a thrashing machine, of an elevator, means in said machine for conveying thrashed grain therefrom into said elevator, a bin adjacent said elevator and supported by said machine said bin having a discharge outlet, means for opening and closing said outlet, means associated with said elevator for receiving grain discharging through said bin outlet, and means for actuating said elevator to convey grain from said machine and bin.

10. The combination, with a thrashing machine, of an elevator, means in said machine for conveying thrashed grain therefrom into said elevator, a bin adjacent said elevator and supported by said machine said bin having a discharge outlet, means for opening and closing said outlet, means associated with said elevator for receiving grain discharging through said outlet, means for actuating said elevator to convey grain from said bin and said machine, and means for conveying grain from said elevator.

11. The combination, with a thrashing machine, of an elevator, means associated with said machine for actuating said elevator, means for conveying grain from the machine into the elevator, a wheeled support connected to said machine, a bin adjacent the elevator and mounted on said support said bin having an outlet for the discharge of grain into the elevator, and a conveyor connected to said elevator for discharging the grain elevated thereby.

In testimony whereof I affix my signature.

WALLACE F. MacGREGOR.